United States Patent [19]

Herron et al.

[11] Patent Number: 5,238,607
[45] Date of Patent: Aug. 24, 1993

[54] PHOTOCONDUCTIVE POLYMER COMPOSITIONS AND THEIR USE

[75] Inventors: Norman Herron, Newark; Ying Wang, Wilmington, both of Del.

[73] Assignee: E. I. Du Pont de Nemours and Company, Wilmington, Del.

[21] Appl. No.: 843,657

[22] Filed: Feb. 28, 1992

[51] Int. Cl.$^5$ .......................... H01B 1/06; C08K 3/00
[52] U.S. Cl. ..................... 252/518; 524/413; 524/414; 524/418; 524/401; 430/901
[58] Field of Search ............... 524/414, 420, 413, 415, 524/418, 401; 252/518; 430/901

[56] References Cited

U.S. PATENT DOCUMENTS 4,738,798  4/1988  Mahler ................................ 524/420

FOREIGN PATENT DOCUMENTS 2279839  12/1987  Japan .
8909884   9/1990  PCT Int'l Appl. .
8909885   9/1990  PCT Int'l Appl. .

OTHER PUBLICATIONS

"Mechanism of Photoconductivity in Microcrystalline Powders", Bube, *J. of Applied Physics*, vol. 31, No. 12, Dec. 1990.
"Photoconductivity and Related Phenomena", edited by J. Mort and D. M. Pai, Elsevier Scientific Publishing Co., Amsterdam (1976) pp. 126–128 & 469–476.
H. Hoegl, J. Phys. Chem., 69, 755–766 (1965).
"Electrical Properties of Polymers", D. A. Seanor, Academic Press, New York (1982), pp. 93–125.
P. J. Regensburger, "Photochemistry and Photobiology", Pergamon Press, vol. 8 (1968), pp. 429–440.
W. Mahler, Inorganic Chem., vol. 27, No. 3, 1988, pp. 435–436.
Y. Wang and N. Herron, J. Phys. Chem., 1991, 95, pp. 525–532.
I. G. Dance et al., J. Am. Chem. Soc. 1984, 106, p. 6285.
J. Calbrese et al., J. Am. Chem. Soc. 1991, 112, p. 2328.

*Primary Examiner*—Paul R. Michl
*Assistant Examiner*—Tae H. Yoon

[57] ABSTRACT

The photoconductive range of a photoconductive polymer can be extended to include longer wavelengths, and/or the photo-induced discharge rate of a photoconductive polymer can be increased by incorporating effective amounts of clusters of IIB–VIB, IIB–VB, IIIB–VB, IIIB–VIB, IB–VIB and/or IVB–VIIB semiconductors, said clusters having a size within the range of from about 0.001 $\mu$m to 10 $\mu$m. Compositions comprising a photoconductive polymer and an effective amount of said clusters may be used in electrostatic imaging processes.

18 Claims, 2 Drawing Sheets

PHOTOCONDUCTIVE POLYMER COMPOSITIONS AND THEIR USE

FIELD OF THE INVENTION

This invention relates to photoconductive compositions comprising photoconductive polymers, and use thereof.

BACKGROUND OF THE INVENTION

Inorganic semiconductors, such as zinc oxide, cadmium sulfide and Se, have been recognized for years as useful photoconductive elements or components thereof in applications such as electrostatic imaging due to their high photosensitivity. Photoconductive elements are generally required to be in the form of high quality large area thin films. However, such films are difficult to fabricate from most semiconductors and the photoconductive properties of even these semiconductors are very sensitive to the presence of defects in their film forms. Consequently, only a few, specifically ZnO, CdS and Se have been developed into useful photo-conductive films. A useful review of such materials and applications is found in "Photoconductivity and Related Phenomena", edited by J. Mort and D. M. Pai, Elsevier Scientific Publishing Company, Amsterdam (1976), particularly pages 126–128 and 469–476 thereof.

The need for better, cheaper and more flexible photoconductors has focused investigation into polymeric materials as possible photoconductors, because of the relative ease of film fabrication. A variety of organic systems, such as polymers and compositions comprising low molecular weight organic compounds embedded in nonphotoconducting polymers, were found to have promising properties. Useful reviews of such materials are found in H. Hoegl, J. Phys. Chem., 69, 755–766 (1965) and "Electrical Properties of Polymers", edited by D. A. Seanor, Academic Press, New York (1982), pages 93–125. In spite of the many advances in organic systems, the need exists for organic systems which have photoconductive properties comparable to inorganic materials, because polymers are in general not as efficient as inorganics for photogeneration of charges.

Attempts to mix inorganic semiconductors and polymers by physical methods such as deposition are described by P. J. Regensburger, "Photochemistry and Photobiology", Pergamon Press, Volume 8 (1968), pages 429–440. However, these attempts were unsuccessful in that the disadvantages of each separate material, i.e., relatively low polymer photoconductivity and poor quality inorganic semiconductor structure, still exist.

PCT International Publication Number WO 90/09884 discloses compositions consisting essentially of a porous glass matrix, the pores of which comprise a III-V semiconductor, and optionally, a polymer; PCT International Publication Number WO 90/09885 discloses compositions consisting essentially of a porous glass matrix, the pores of which contain a semiconductor and a polymer; and W. Mahler, Inorganic Chem., Vol. 27, Number 3, 1988, pp. 435–436 discloses various methods of preparing small particle semiconductors in various rigid matrices, including ethylene/methacrylic acid copolymer. However, none of these compositions are known to be photoconductive.

SUMMARY OF THE INVENTION

This invention involves the advantageous combination of photoconductive polymers with inorganic semiconductors. Methods are provided for extending the photoconductive range of a photoconductive polymer to include longer wavelengths and increasing the photo-induced discharge rate of a photoconductive polymer by incorporating effective amounts of clusters of at least one inorganic semiconductor selected from the group consisting of IIB-VIB semiconductors, IIB-VB semiconductors, IIIB-VB semiconductors, IIIB-VIB semiconductors, IB-VIB semiconductors and IVB-VIIB semiconductors, wherein said clusters have a size within the range of from about 0.001 $\mu$m to 10 $\mu$m. Photoconductive compositions are provided which comprise photoconductive polymer(s) and effective amounts of said clusters. Photoconductive compositions provided by this invention (e.g., films) are useful as photoconductive elements (or components thereof) for electrostatic imaging, and a process of electrostatic imaging using a photoconductive polymer is provided herein which is characterized by using said compositions Having briefly summarized the invention, the invention will now be described in detail by reference to the following specification and non-limiting examples. Unless otherwise specified, all percentages are by weight and all temperatures are in degrees Celsius.

DETAILED DESCRIPTION OF THE INVENTION

Figure 1:
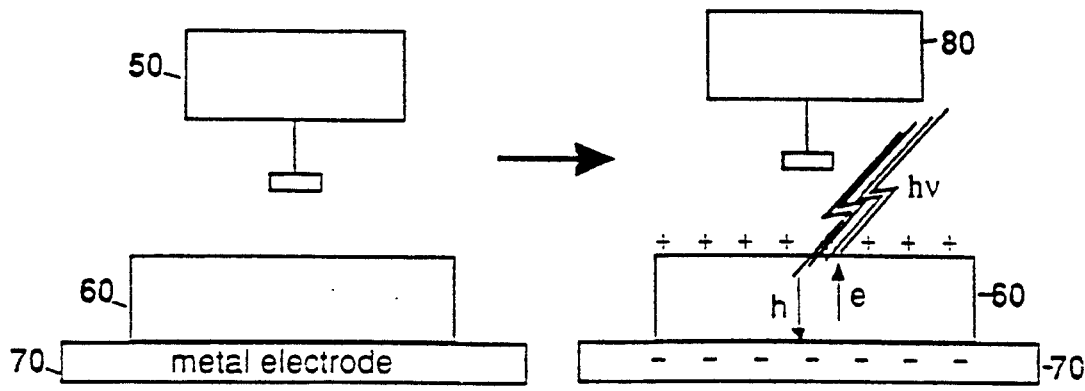
FIG. 1 is a schematic view of an apparatus for measurement of the photo-induced discharge of the photoconductive compositions of the invention.

In accordance with this invention clusters of at least one inorganic semiconductor are dispersed throughout at least one photoconductive polymer. The resulting compositions, while incorporating polymer processibility, have higher photoconductivity (e.g., photo-induced discharge rate) and/or an extended photoconductive range (e.g., to visible and infrared) when compared to the photoconductive polymer.

The inorganic semiconductors useful in the practice of this invention are selected from at least one of IIB--VIB, IIB-VB, IIIB-VB, IIIB-VIB, IB-VIB, and IVB-VIIB semiconductors. A IIB-VIB semiconductor is a compound which contains at least one element from Group IIB of the periodic table and at least one element from Group VIB of the periodic table; group IIB-VB semiconductor, at least one element from Group IIB of the periodic table and at least one element from Group VB of the periodic table; and, respectively, for the other useful semiconductors listed.

Preferred IIB-VIB semiconductors are CdS, ZnS, ZnMnS, and HgS; preferred IIB-VB, $Cd_2P_3$; preferred IIIB-VB, InAs, InP and GaP; preferred IIIB-VIB, $In_2S_3$, $Ga_2S_3$ and $In_2Se_3$; preferred IB-VIB, $Ag_2S$ and $Cu_2S$; and preferred IVB-VIIB, $PbI_2$.

The clusters of at least one inorganic semiconductor are usually present in an amount from 0.01 to 50% by weight, based on the total weight of the photoconductive composition and, preferably, in an amount from 0.10 to 20% by weight, based on the total weight of the photoconductive composition. Each cluster can range in size from $1 \times 10^{-3}$ μm to 10 μm, preferably from $1 \times 10^{-3}$ μm to 1 μm, and more preferably from $1 \times 10^{-3}$ μm (10 Angstroms) to 0.1 μm (1000 Angstroms).

The clusters of semiconductor useful in the practice of this invention can be prepared in accordance with the disclosure of Y. Wang and N. Herron, J. Phys. Chem., 1991, 95, 525–532, which disclosure also details the properties and structure thereof. These clusters possess structures that are substantially the same as bulk semiconductors, yet can have properties which are dramatically different from the bulk semiconductors. The electronic properties of the clusters depend primarily on the cluster size, a phenomenon commonly referred to as the quantum size or quantum confinement effect. The effect is manifested as a blue-shift in the energy of the exciton, i.e., an electron-hole pair bounded by Coulomb interaction and enhancement in the volume-normalized oscillator strength as the cluster size becomes comparable to or below that of the exciton size.

The polymers used in the practice of this invention are photoconductive. Typically these polymers are charge carrying polymers, (i.e., they are able to transport charge carriers efficiently). Polymers exhibiting moderate photoconductivity commonly fit this criterion. Without limiting the invention to a particular theory of operation, it is believed these polymers interact with the clusters of semiconductor to facilitate the carrier injection from the cluster component to the polymer component of the photoconductive composition.

The photoconductive compositions provided by the invention may contain a variety of charge carrying polymers. While a wide range of charge carrying polymers may be used, typical charge carrying polymers include: polyvinylcarbazole, polystyrene, polyvinylxylene, poly-1-vinylnaphthalene, poly-2-vinylnaphthalene, poly-4-vinylbiphenyl, poly-9-vinylanthracene, poly-3-vinyl-pyrene, poly-2-vinylquinoline, polyindene, polyacena-phthylene, poly(3,3'-dimethyldiphenylene-4,4'), polyacrylamide, polymethacrylamide, and the like. Polyvinylcarbazole is most preferred for overall advantageous properties.

Since, in accordance with this invention, the size of the cluster is often comparable to or less than the wavelength of light, the clusters show minimal light scattering when dispersed within a polymer. Consequently, thin films fabricated from the photoconductive compositions of the invention are typically transparent. Furthermore, because of the small size of the clusters utilized in the practice of this invention, the clusters tend to behave like molecules and can, therefore, be easily dissolved in a wide variety of organic liquids or polymer solutions. Good quality thin films of the photoconductive compositions of the invention can conveniently be prepared by spin-coating of a solution of the clusters and charge carrying polymer or, alternatively, the clusters can be directly synthesized inside the polymer film. In the photoconductive compositions of this invention, the clusters of semiconductors function as the photogenerator of charge carriers. Therefore, the photoconductive compositions of this invention possess the ease of fabrication of polymeric materials and the charge generation efficiency of semiconductor clusters.

Compositions of this invention may be used for applications in electrostatic imaging processes which have heretofor employed polymers and/or bulk semiconductors. In these applications the photoconductive compositions of this invention cause conductivity to increase in the exposed area to dissipate surface charge partially or wholly in the exposed area and to leave a substantially unaffected charge in the unexposed area. The resulting electrostatic latent image can be developed by conventional means, for example, by electrostatic toners. The developed image can be viewed directly, or as is known in the art, transferred to a receptor such as paper or a polymeric substrate by electric fields, volatile solvents, or transfer techniques such as those disclosed by Schaffert, Electrophotography, (Focal Press, London, 1973).

Where the photoconductive element is in the form of a self-supporting film or a coating, one side of the photoconductive element preferably contacts an electrically conductive surface during charging of that element. Where the photoconductive element is a self-supporting film, the film may be metallized on one side by, for example, aluminum, silver, copper, nickel, and the like to provide an electrically conductive layer for contacting an electrically conductive surface during charging. Alternatively, an electrically conductive surface may be provided by laminating the metallized films to provide a metal foil. As a further alternative, the photoconductive element can be brought into direct electrical contact with a conducting surface to effect charging. Good contact between the film and the conducting surface can be insured by wetting the conducting layer with water or a suitable organic liquid, such as ethanol, acetone or a conductive fluid.

The electrically conductive surface employed to charge the photoconductive element can be in the form of a plate, sheet or layer having a specific resistivity smaller than that of the photoconductive element generally less than $10^9$ ohm-cm, preferably $10^5$ ohm-cm or less. Accordingly, suitable electrically conductive surfaces include metal sheets, or insulators such as glass, polymer films, or paper which are coated with conductive coatings or wetted with conductive liquids or otherwise are made conductive.

The surface of the photoconductive elements that employ the photoconductive compositions of this invention can be charged for image retention by well known techniques such as corona discharge, contact charge, capacitive discharge, and the like. Charging preferably is performed in darkness or in subdued illumination. Either negative or positive potential can be applied. Negative potential is preferred when positively-charged developers are employed. During charging, the electrically conductive surface of the photoconductive element should be grounded.

In performing photo-imaging, the photoconductive compositions of this invention can be carried on a support or fabricated into a self-supporting photoconductive layer, grounded, and given a surface electrostatic charge. The charged surface can be given a conventional exposure to actinic radiation to produce an electrostatic latent image.

When the photoconductive elements comprising the photoconductive compositions of this invention are exposed to electromagnetic radiation, the exposed areas are discharged to leave the unexposed areas more highly charged. The resulting electrostatic image can be converted to a visible image according to standard electrophotographic development techniques. Suitable developers or toners include charged aerosols, powders, or liquids containing finely divided, charged substances which are attracted to the charged image areas. Preferably, latent images are developed by contact with a developer formed of a carrier and toner. Suitable carriers include glass balls, iron powder, plastic balls, or low boiling dielectric liquids. Useful toners include resin/pigment mixtures that have a grain size from 1 to 100 micrometers. Other useful carriers and toners may be readily determined by those skilled in the art.

The photoconductive compositions in accordance with this invention can be fabricated into a variety of photoconductive elements depending on the requirements of the photoimaging application. The photoconductive elements that comprise the photoconductive compositions of the invention can be employed in the form of, for example, self-supporting films, or as coatings on support materials. Coatings can be formed on a support material by conventional methods, for example, spraying, spin-coating, draw-coating, and the like.

In addition the photoconductive compositions in accordance with this invention can be useful in various processes for electrostatic or xerographic image reproduction. One significant application for such materials is in the fabrication of printed circuitry. Further, the photoconductive compositions of the invention can be employed as photodectors.

Practice of the invention will be further apparent from the following non-limiting Examples.

EXAMPLES

Photo-induced discharge analysis

The photoconductivity of a film of photoconductive composition according to the invention is measured by photo-induced discharge as shown schematically in FIG. 1. Generally, photoconductive film (60) is cast onto a metal (typically aluminum or tin oxide) electrode (70) by known methods such as evaporation or spin-coating. The film typically has a thickness of from 0.1 to 20 microns. The surface of film (60) is charged by a corona charger (50). The presence of charge on film (60), as is known in art, can be detected by electrostatic voltmeter (80). Upon exposure to light to induce photo discharge of film (60), electrons and holes are believed to be generated in the film (60) which migrate to the surface of film (60) to discharge. The rate and the completeness of the photo-induced discharge gauge the photo conductive properties of the film (60).

Figure 2:
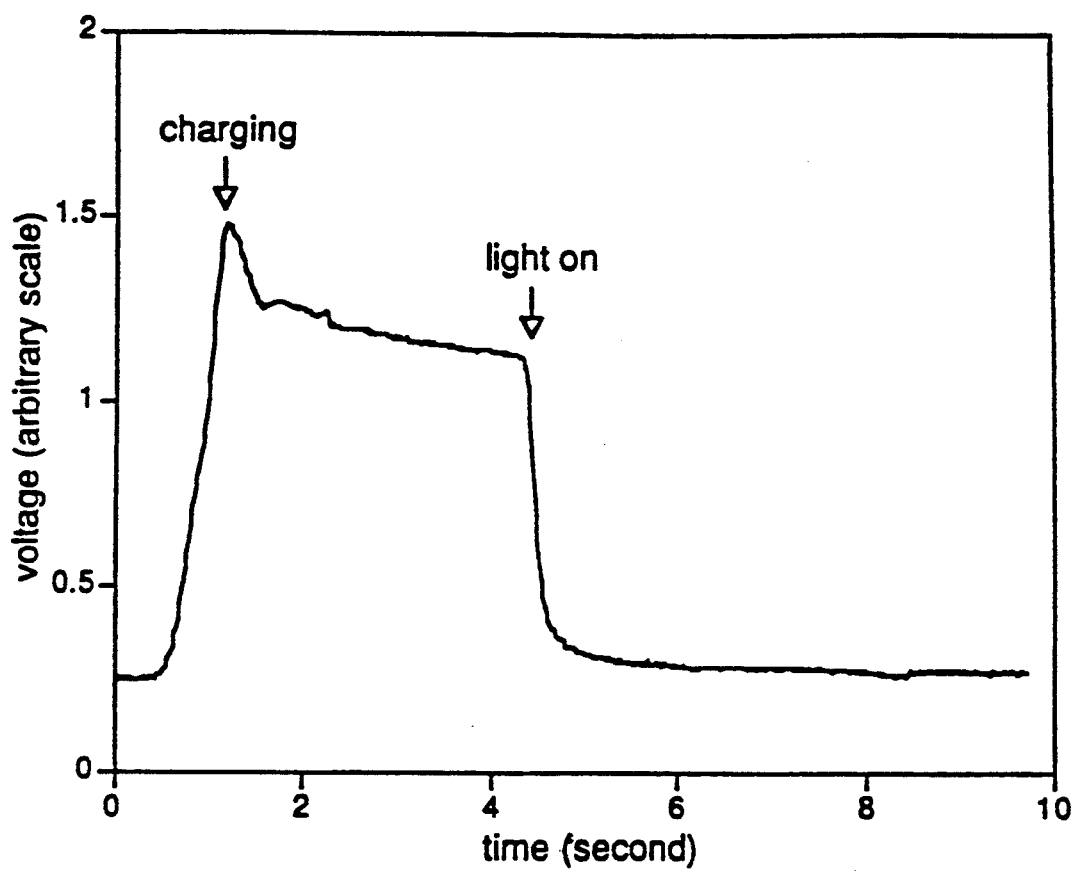
FIG. 2 is a typical trace from photo-induced discharge of the photoconductive compositions of the invention.

A typical trace of the photo-induced discharge experiment is shown in FIG. 2, with onsets of charging and photo-induced discharging clearly marked. (The "charging" time and "light on" times in FIG. 2 are for illustrative purposes only, and vary from example to example). A field strength is defined as the voltage at the beginning of discharge (light on) divided by the film thickness. The $t_{\frac{1}{2}}$ represents the half-life of the photo-induced discharge decay curve.

EXAMPLE 1

CdMnTe Clusters in Polyvinylcarbazole

CdMnTe nanoparticles capped with thiophenol were prepared by an arrested precipitation method as follows: All under an inert $N_2$ atmosphere, 1.488 g cadmium acetate and 2.90 g manganese acetate were dissolved in 20 ccs dimethyl formamide (DMF). A second solution of 2.12 g thiophenol in 24 ccs DMF was added with stirring and finally a third solution of 0.409 g tellurium powder in 0.5 g triethylphosphine dissolved in 8 ccs DMF was added with vigorous stirring. The resultant pale yellow solution was boiled for 30 minutes during which the solution became dark red and was then evaporated to dryness giving a dark red/black solid. This solid was then heated to 400° C. under vacuum for 30 minutes to give the final solid of approximate composition $CdMn_{0.94}Te_{0.87}$ and approximate cluster size of 45 Å (x-ray diffraction). 0.2 g of this solid was dissolved into 0.5 ccs of a stock solution of 1.0 g polyvinylcarbazole polymer(PVK) dissolved in 14 ccs DMF. This solution was spin-coated onto a conductive aluminum sheet under a nitrogen blanket to give a film. The results of photoconductivity assessment of the film are shown in Table 1.

EXAMPLE 2

CdS Clusters in Polyvinylcarbazole

Thiophenol capped CdS nanoparticles were prepared by taking 0.5 g of cluster $(NMe_4)_4Cd_{10}S_4SPh_{16}$, prepared in accordance with I. G. Dance et al. *J. Am. Chem. Soc.* 1984, 106, 6285, and heating to 260° C. under 600 torr nitrogen for 1 hour. The resultant pale yellow material has the stoichiometry $Cd_{10}S_4SPh_{12}$. 0.06 g of the yellow solid was dissolved into 0.5 ccs of a stock solution of 1.5 g PVK polymer dissolved in 7 ccs pyridine. The clear solution was then dip-coated onto an aluminum sheet to give a clear yellow film. The film on the aluminum sheet was then heated to 250° C. under 500 torr pressure of $H_2S$ for 30 mins during which time it developed a bright orange coloration. The film was evacuated and recovered. The results of photoconductivity assessment of the film are shown in Table 1.

EXAMPLE 3

ZnS Clusters in Polyvinylcarbazole

Under an inert $N_2$ atmosphere, 0.02 g zinc acetate was dissolved into 1 cc of a stock solution made by dissolving 1.5 g PVK polymer into 15 ccs pyridine. The clear solution was then dip-coated onto an aluminum sheet to give a clear colorless film. The film on the aluminum sheet was then heated to 200° C. under 500 torr pressure of $H_2S$ for 120 mins during which time it developed a pale yellow coloration. The film was evacuated and recovered. The results of photoconductivity assessment of the film are shown in Table 1.

EXAMPLE 4

ZnMnS Clusters in Polyvinylcarbazole

ZnMnS nanoparticles capped with thiophenol were prepared by an arrested precipitation method as follows: All under an inert $N_2$ atmosphere, 9.0 g zinc acetate and 2.0 g manganese acetate were dissolved in 200 ccs DMF. A second solution of 4.37 g thiophenol in 100 ccs DMF was added with stirring and finally a third solution of 2.30 g sodium sulfide (anhydrous) powder in 50 ccs water and 50 ccs DMF was added with vigorous stirring. The resultant pale yellow solution was evaporated to dryness giving a white, orange luminescent (365 nm excitation) solid. This solid was of approximate cluster size of 25 Å (x-ray diffraction). 0.01 g of this solid was dissolved into 0.5 ccs of a stock solution of 1.5 g PVK polymer dissolved in 7 ccs pyridine. This solution was dip-coated onto a conductive aluminum sheet under a nitrogen blanket to give a film. The results of photoconductivity assessment of the film are shown in Table 1.

EXAMPLE 5

HgS Clusters in Polyvinylcarbazole

Under an inert $N_2$ atmosphere, 0.02 g mercuric acetate was dissolved into 1 cc of a stock solution made by dissolving 1.5 g PVK polymer into 15 ccs pyridine. The clear solution was then dip-coated onto an aluminum sheet to give a clear colorless film. The film on the aluminum sheet was then heated to 200° C. under 500 torr pressure of $H_2S$ for 120 mins during which time it developed a dark brown coloration. The film was evacuated and recovered. The results of photoconductivity assessment of the film are shown in Table 1.

EXAMPLE 6

$Cd_3P_2$ Clusters in Polyvinylcarbazole

Films of Cd clusters were deposited exactly as described in Example 2 above. The films were then treated in 300 torr of $PH_3$ at 200° C. for 1 hour where they develop a metallic orange coloration. The phosphine gas was then removed by evacuation and the films were recovered. The results of the photoconductivity assessment of the film are shown in Table 1.

EXAMPLE 7

InAs Clusters in Polyvinylcarbazole

In an inert atmosphere glove box, 0.01 g trimethylindium was dissolved in 0.5 ccs of a stock solution prepared by dissolving 1.5 g PVK in 7 ccs pyridine. The solution was dip-coated onto aluminum and the dried film on Al was then subjected to 300 torr arsine gas at 100° C. for 30 mins. The originally colorless film became dark chocolate brown. After evacuation the film was recovered. The results of photoconductivity assessment of the film are shown in Table 1.

EXAMPLE 8

InP Clusters in Polyvinylcarbazole

In an inert atmosphere glove box, 0.01 g trimethylindium was dissolved in 0.5 ccs of a stock solution prepared by dissolving 1.5 g PVK in 7 ccs pyridine. The solution was dip-coated onto aluminum and the dried film on Al was then subjected to 300 torr $PH_3$ gas at 100° C. for 30 mins. The originally colorless film became orange. After evacuation the film was recovered. The results of photoconductivity assessment of the film are shown in Table 1.

EXAMPLE 9

GaP Clusters in Polyvinylcarbazole

In an inert atmosphere glove box, 0.01 g triethylgallium was dissolved in 0.5 ccs of a stock solution prepared by dissolving 1.5 g PVK in 7 ccs pyridine. The solution was dip-coated onto aluminum and the dried film on Al was then subjected to 300 torr $PH_3$ gas at 100° C. for 30 mins. The originally colorless film became pale yellow. After evacuation the film was recovered. The results of photoconductivity assessment of the film are shown in Table 1.

EXAMPLE 10

$Ga_2S_3$ Clusters in Polyvinylcarbazole

In an inert atmosphere glove box, 0.01 g triethylgallium was dissolved in 0.5 ccs of a stock solution prepared by dissolving 1.5 g PVK in 7 ccs pyridine. The solution was dip-coated onto aluminum and the dried film on Al was then subjected to 500 torr $H_2S$ gas at 100° C. for 30 mins. The originally colorless film became pale yellow. After evacuation the film was recovered. The results of photoconductivity assessment of the film are shown in Table 1.

EXAMPLE 11

$In_2S_3$ Clusters in Polyvinylcarbazole

In an inert atmosphere glove box, 0.02 g trimethylindium was dissolved in 1.0 ccs of a stock solution prepared by dissolving 1.5 g PVK in 15 ccs pyridine. The solution was dip-coated onto aluminum and the dried film on Al was then subjected to 500 torr $H_2S$ gas at 200° C. for 120 mins. The originally colorless film became yellow. After evacuation the film was recovered. The results of photoconductivity assessment of the film are shown in Table 1.

EXAMPLE 12

$In_2Se_3$ Clusters in Polyvinylcarbazole

In an inert atmosphere glove box, 0.02 g trimethylindium was dissolved in 1.0 ccs of a stock solution prepared by dissolving 1.5 g PVK in 15 ccs pyridine. The solution was dip-coated onto aluminum and the dried film on Al was then subjected to 300 torr $H_2Se$ gas at 100° C. for 120 mins. The originally colorless film became orange. After evacuation the film was recovered. The results of photoconductivity assessment of the film are shown in Table 1.

EXAMPLE 13

$PbI_2$ Clusters in Polyvinylcarbazole

In an inert atmosphere glove box, 0.02 g $(NH_3C_{10}H_{21})_3Pb_2I_7$, as prepared in accordance with J. Calabrese et al., *J. Am. Chem. Soc.* 1991, 112, 2328, was dissolved in 1.0 ccs of a stock solution prepared by dissolving 1.5 g PVK in 15 ccs pyridine. The solution was dip-coated onto aluminum and, as it dried, the yellow solution became a red film. The results of photoconductivity assessment of the film are shown in Table 1.

EXAMPLE 14

$Ag_2S$ Clusters in Polyvinylcarbazole

In an inert atmosphere glove box, 0.02 g silver perchlorate was dissolved in 1.0 ccs of a stock solution prepared by dissolving 1.5 g PVK in 15 ccs pyridine. The solution was dip-coated onto aluminum and the dried film on Al was then subjected to 500 torr $H_2S$ gas at 200° C. for 120 mins. The originally colorless film became dark brown. After evacuation the film was recovered. The results of photoconductivity assessment of the film are shown in Table 1.

EXAMPLE 15

CuS Clusters in Polyvinylcarbazole

In an inert atmosphere glove box, 0.02 g copper acetate was dissolved in 1.0 ccs of a stock solution prepared by dissolving 1.5 g PVK in 15 ccs pyridine. The solution was dip-coated onto aluminum and the dried film on Al was then subjected to 500 torr $H_2S$ gas at 200° C. for 120 mins. The originally blue film became green-brown. After evacuation the film was recovered. The results of photoconductivity assessment of the film are shown in Table 1.

TABLE 1

PHOTO-INDUCED DISCHARGE[a]

| Example # | sample | $t_{\frac{1}{2}}$ sec[b] | thickness, micron | field strength, volt/cm |
|---|---|---|---|---|
| 1 | CdMnTe/PVK | 1.6 | 2.7 | 6.9E5 |
| 2 | CdS/PVK | 0.13 | 2.7 | 3.3E5 |
| 3 | ZnS/PVK | 7.7 | 5.7 | 7.8E5 |
| 4 | ZnMnS/PVK | 8.3 | 5.6 | 3.7E5 |
| 5 | HgS/PVK | 0.36 | 3.5 | 1.1E6 |
| 6 | $Cd_3P_2$/PVK | 0.86 | 4.8 | 6.2E5 |
| 7 | InAs/PVK | 0.44 | 2.7 | 2.0E5 |
| 8 | InP/PVK | 0.65 | 2.4 | 3.8E5 |
| 9 | GaP/PVK | 0.53 | 3.6 | 1.1E5 |
| 10 | $Ga_2S_3$/PVK | 0.3 | 3.3 | 6.4E5 |
| 11 | $In_2S_3$/PVK | 0.08 | 2.2 | 3.9E5 |
| 12 | $In_2Se_3$/PVK | 5.2 | 3.6 | 1.1E6 |
| 13 | $PbI_2$/PVK | 1.4 | 1.8 | 1E6 |
| 14 | $Ag_2S$/PVK | 0.3 | 3.7 | 1.4E5 |
| 15 | CuS/PVK | 3.7 | 3.5 | 8.3E5 |

[a]Irradiation source - 50 mW/cm² tungsten lamp.
[b]$t_{\frac{1}{2}}$ represents the half-life time of photo-induced discharge decay curve.

A representative $t_{178}$ for PVK alone is 18 seconds for a film thickness of 6 microns and a field strength of 6E5 volt/cm (i.e., $6 \times 10^5$ volt/cm).

Particular embodiments of the invention are included in the examples. Other embodiments will become apparent to those skilled in the art from a consideration of the specification or practice of the invention disclosed herein. It is understood that modifications and variations may be practical without departing from the spirit and scope of the novel concepts of this invention. It is further understood that the invention is not confined to the particular formulations and examples herein illustrated, but it embraces such modified forms thereof as come within the scope of the following claims.

What is claimed is;

1. A method of extending the photoconductive range of a photoconductive polymer to include longer wavelengths comprising the step of: forming a photoconductive composition by incorporating into said polymer an effective amount, within the range from about 0.1 to 50 percent by weight of the resulting photoconductive composition, of clusters of at least one inorganic semiconductor selected from the group consisting of IIB–VIB semiconductors, IIB–VB semiconductors, IIIB–VB semiconductors, IIIB–VIB semiconductors, IB–VIB semiconductors and IVB–VIIB semiconductors, wherein said clusters have a size within the range of from about 0.001 μm to 10 μm.

2. The method of claim 1 wherein said clusters are added in an amount effective to increase the photo-induced discharge rate of said photoconductive polymer.

3. A method of increasing the photo-induced discharge rate of a photoconductive polymer comprising the step of: forming a photoconductive composition by incorporating into said polymer an effective amount, within the range of from about 0.01 to 50 percent by weight of the resulting photoconductive composition, of clusters of at least one inorganic semiconductor selected from the group consisting of IIB–VIB semiconductors, IIB–VB semiconductors, IIIB–VB semiconductors, IIIB–VIB semiconductors, IB–VIB semiconductors and IVB–VIIB semiconductors, wherein said clusters have a size within the range of from about 0.001 μm to 10 μm.

4. The method of claim 1 or claim 3 wherein said clusters have a size within the range of from about 10 Angstroms to 1000 Angstroms.

5. The method of claim 4 wherein the clusters are selected from the group consisting of CdS, ZnS, ZnMnS, HgS, $Cd_2P_3$, InAs, InP, GaP, $In_2S_3$, $Ga_2S_3$, $In_2Se_3$, $Ag_2S$, $Cu_2S$, and $PbI_2$.

6. The method of claim 4 wherein the photoconductive polymer is selected from the group consisting of polyvinylcarbazole, polystyrene, polyvinylxylene, poly-1-vinylnaphthalene, poly-2-vinylnaphthalene, poly-4-vinylbiphenyl, poly-9-vinylanthracene, poly-3-vinyl-pyrene, poly-2-vinylquinoline, polyindene, polyacena-phthylene, poly(3,3'-dimethyldiphenylene-4,4'), polyacrylamide, and polymethacrylamide.

7. The method of claim 4 wherein the polymer is polyvinylcarbazole.

8. The method of claim 4 wherein the clusters are incorporated in an amount from 0.01 to 20% by weight.

9. A photoconductive composition comprising:
   (a) a photoconductive polymer; and
   (b) clusters of at least one semiconductor selected from the group consisting of IIB–VIB semiconductors, IIB–VB semiconductors, IIB–VB semiconductors, IIIB–VIB semiconductors, IB–VIB semiconductors and IVB–VIIB semiconductors, wherein said clusters have a size range of from about 0.001 μm to 10 μm and are present in an amount, from 0.01 to 50 percent by weight based upon the total weight of the photoconductive composition, effective to extend the photoconductive range of the composition to include a longer wavelength than the range of said polymer.

10. The photoconductive composition of claim 9 wherein said clusters are present in an amount effective to provide a photo-induced disclosure rate which is higher than the rate of said polymer.

11. A photoconductive composition comprising:
   (a) a photoconductive polymer; and
   (b) clusters of at least one semiconductor selected from the group consisting of IIB–VIB semiconductors, IIB–VB semiconductors, IIIB–VB semiconductors, IIIB–VIB semiconductors, IB–VIB semiconductors and IVB–VIIB semiconductors, wherein said clusters have a size range of from about 0.001 μm to 10 μm and are present in an amount, from 0.01 to 50 percent by weight based upon the total weight of the photoconductive composition, effective to provide a photo-induced discharge rate which is higher than the rate of said polymer.

12. The composition of claim 9 or claim 11 wherein said clusters have a size within the range of from about 10 Angstroms to 1000 Angstroms.

13. The composition of claim 12 wherein the clusters are selected from the group consisting of CdS, ZnS, ZnMnS, HgS, $Cd_2P_3$, InAs, InP, GaP, $In_2S_3$, $Ga_2S_3$, $In_2Se_3$, $Ag_2S$, $Cu_2S$, and $PbI_2$.

14. The composition of claim 12 wherein the photoconductive polymer is selected from the group consisting of polyvinylcarbazole, polystyrene, polyvinylxylene, poly-1-vinylnaphthalene, poly-2-vinylnaphthalene, poly-4-vinylbiphenyl, poly-9-vinylanthracene, poly-3-vinyl-pyrene, poly-2-vinylquinoline, polyindene, polyacena-phthylene, poly(3,3'-dimethyldiphenylene-4,4'), polyacrylamide, and polymethacrylamide.

15. The composition of claim 12 wherein the polymer is polyvinylcarbazole.

16. The composition of claim 12 wherein the clusters are incorporated in an amount from 0.01 to 20% by weight.

17. The composition of claim 12 which is formed into a film.

18. A process of electrostatic imaging using a photoconductive polymer characterized by using a composition of claim 12.

* * * * *